Oct. 17, 1967   M. LUZINA ETAL   3,347,117
WHEEL LATHE

Filed March 10, 1966   4 Sheets-Sheet 1

INVENTORS
Max LUZINA
Leo LOUIS
Achim LISON
BY their ATTORNEY

INVENTORS
Max LUZINA
Leo LOUIS
Achim LISON
BY
their ATTORNEY

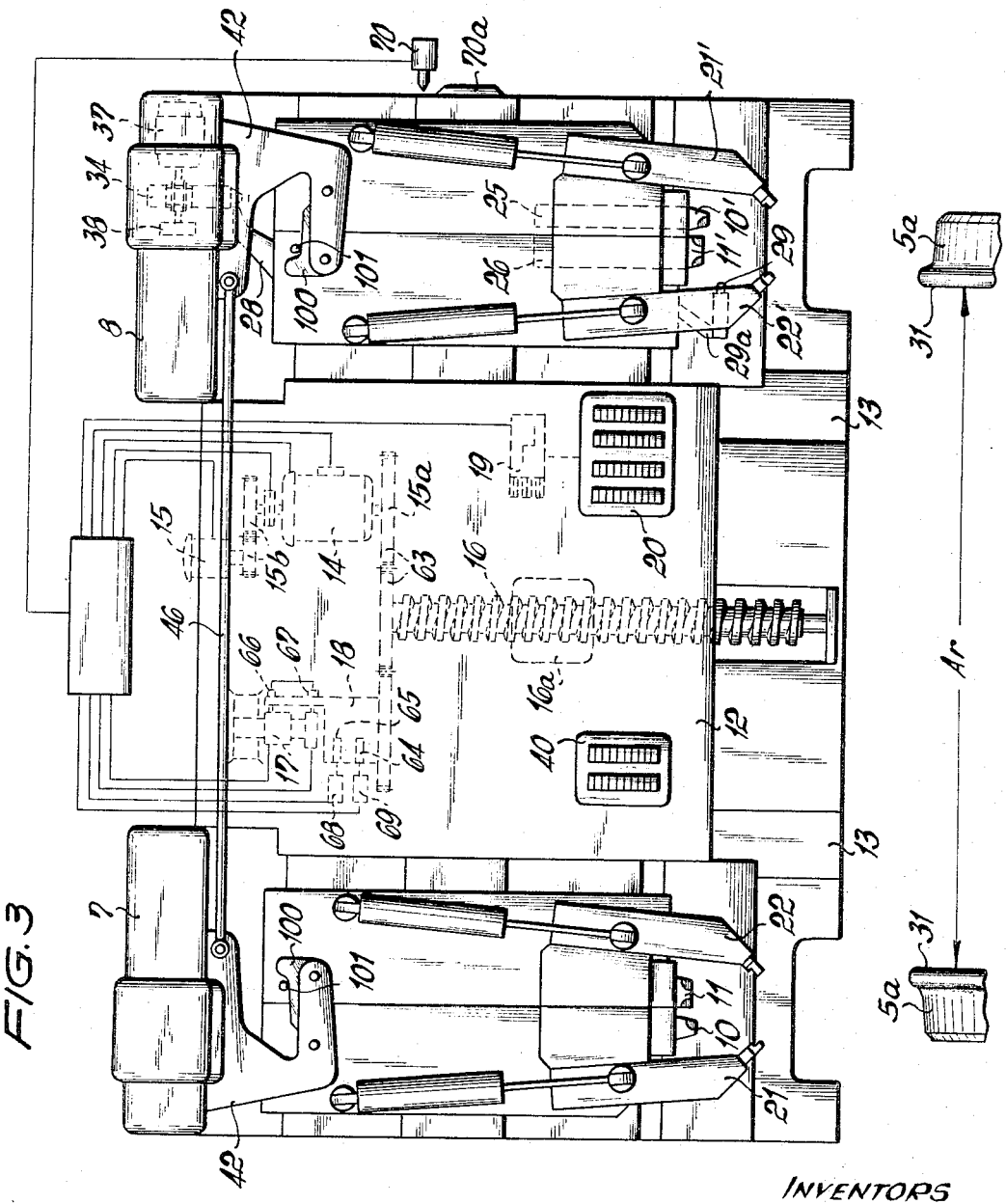

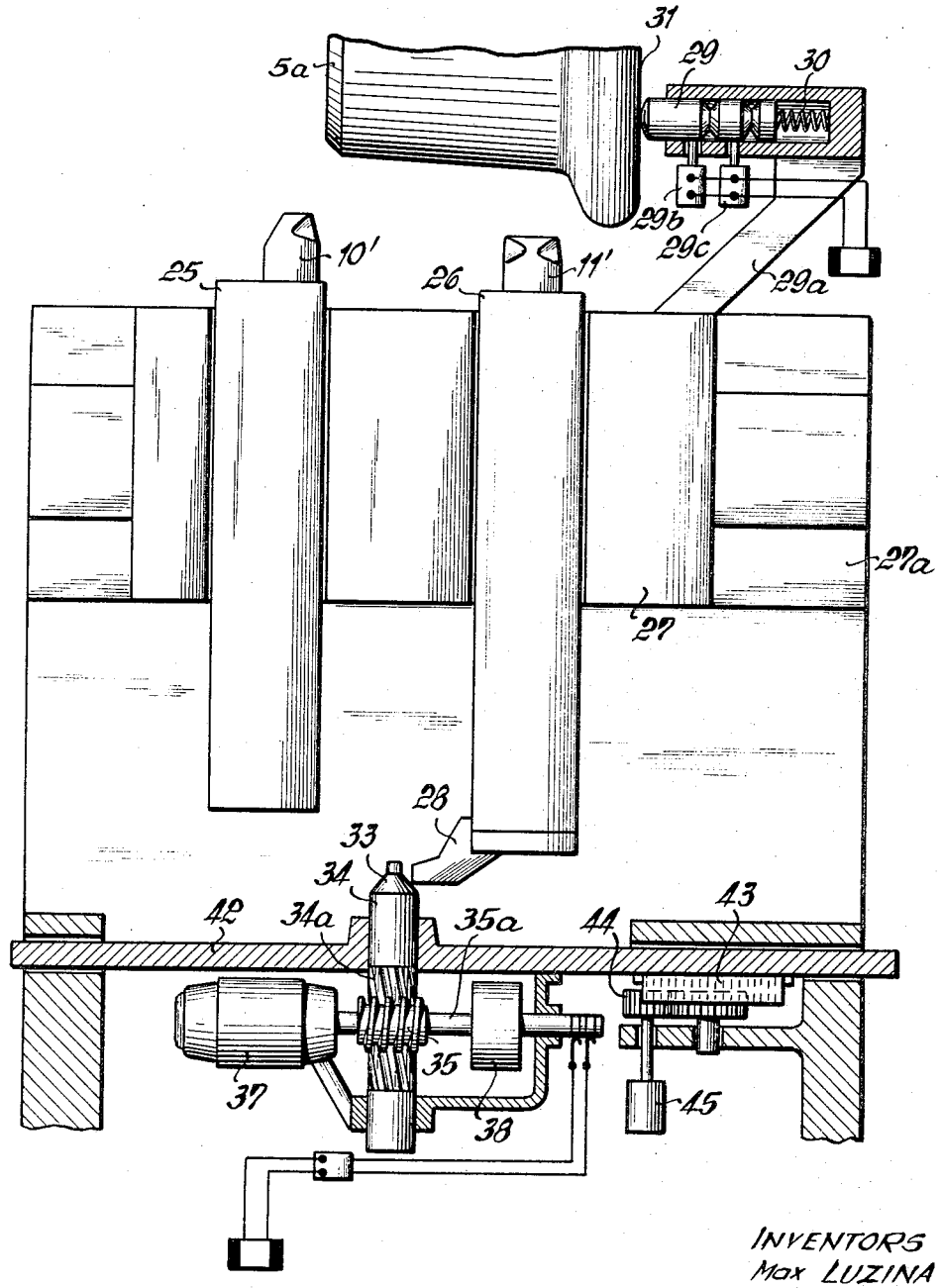

United States Patent Office 3,347,117
Patented Oct. 17, 1967

3,347,117
WHEEL LATHE
Max Luzina, Erkelenz, Rhineland, Leo Louis, Altmyhl, and Achim Lison, Erkelenz, Rhineland, Germany, assignors to Wilhelm Hegenscheidt Kommanditgesellschaft, Erkelenz, Rhineland, Germany
Filed Mar. 10, 1966, Ser. No. 533,169
Claims priority, application Germany, Mar. 10, 1965, H 55,424
16 Claims. (Cl. 82—8)

The present invention relates to wheel lathes in general, and more particularly to improvements in lathes which can treat two mirror symmetrical wheels or similar workpieces at a time. Still more particularly, the invention relates to lathes which are especially suited for reconditioning of wheels on wheel assemblies or wheel sets of railway vehicles.

In certain recent types of wheel lathes, a frame supports two sets of turning tools in such a way that a wheel assembly (including two mirror symmetrical wheels, a common axle for the wheels and two journal boxes) can be advanced into requisite position for engagement by the drive means which rotates the wheel assembly while the tools move radially toward and treat the flanges and/or the rims of both wheels in a simultaneous operation. Each set of turning tools is controlled by a separate copying unit and the two copying units are operatively connected to each other by a suitable control mechanism so that a single programming unit suffices to regulate the movements of all turning tools. The support of each copying unit must be equipped with a separate lateral positioning device which contributes considerably to the complicatedness and overall cost of such lathes. Furthermore, presently known wheel lathes are not equipped with automatic lateral positioning devices which control the axial position of supports for the two copying units. Accurate axial positioning of the wheel assembly and/or supports for copying units is necessary because the axial position of consecutively treated wheel assemblies is not always the same. Differences in axial positioning of consecutively treated wheel assemblies may arise due to inaccurances in the manufacturing of wheel assemblies, due to inaccurances of or wear upon the devices which engage the wheels during turning, and for other reasons.

As a rule, the supports for the copying units of a conventional wheel lathe are adjusted individually, depending on the position of the inner faces of wheels or a wheel assembly. This method of adjusting the supports in the axial direction of a wheel assembly can be resorted to when the distance between the inner faces of the wheels has been checked and was found to be within a permissible range. Any deviations from a desired optimum distance must be divided in half and each support must be adjusted laterally (i.e., axially of the wheel assembly) by full consideration of such deviations. Thus, when the wheel assembly is ready for treatment of its wheels, the central vertical symmetry plane of the lathe must be located exactly midway between the inner faces of the wheels. In accordance with presently prevailing practice, the inner faces of the wheels on a wheel assembly are tracked by the turning tools and the results of such tracking are utilized to effect proper adjustment of supports for the copying units. Eventual deviations are noted and compensated for by sheet-like spacers or the like. Such operation is time-consuming and inaccurate. Also, it cannot be carried out automatically.

On the other hand, automatic reconditioning of consecutive wheel assemblies is highly desirable to reduce the time necessary for a reconditioning operation and to reduce the number of persons attending the lathe. Since the wear on consecutively treated wheels is rarely the same and, in order to insure that the reconditioning operation will be satisfactory, the lathe must be adjusted separately for each consecutive wheel assembly. Of course, such individual adjustments of the lathe for each consecutively treated wheel assembly hinder the automatic operation. It is, therefore, customary to utilize a programming unit which stores information regarding the desired diameter of the finished wheel assembly, the distance between the inner faces of the wheels, the gauge, and other important data. Such information is stored by resorting to a set of pushbuttons or analogous actuating elements which are operated by the person in charge, preferably by the attendant who is in charge of exchanging the turning tools. The attendant receives the information to be stored from a measuring stand which is built into the production line in a railway repair or maintenance shop.

It is an important object of the present invention to improve the construction and operation of the above outlined conventional wheel reconditioning lathes and to provide a lathe wherein the adjustment of supports for copying units is simplified not only as regards the movements of tools radially of the wheels but particularly as regards axial positioning of such supports with reference to a wheel assembly which is ready for treatment.

Another object of the invention is to provide a wheel lathe wherein the axial or lateral adjustment of the aforementioned supports may be effected in a fully automatic way.

A further object of the invention is to bring about considerable economies in the manufacture and maintenance of wheel lathes.

An additional object of the present invention is to provide a novel and improved wheel lathe which, though especially suited for treating the rims and flanges of wheels for railway vehicles, is equally suited for treating many other types of workpieces wherein a pair of mirror symmetrical components should be treated in a simultaneous operation.

Still another object of the invention is to provide a novel control system for effecting axial parents adjustments of supports for copying units in a wheel lathe.

A concomitant object of the invention is to provide a novel system of holders for templets in a lathe of the above outlined characteristics.

A further object of the invention is to provide a novel lateral positioning device for the templet holders.

Briefly stated, one feature of the present invention resides in the provision of a machine tool, particularly a wheel lathe for reconditioning the wheels of wheel sets for railway vehicles and analogous pairwise arranged mirror symmetrical workpieces. The improved machine tool comprises a frame, preferably a portal type frame which defines a passage through which the wheel sets to be reconditioned may be conveyed seriatim to a position for treatment, drive means including means for engaging and rotating the workpieces about a common axis (in the case of wheel sets, about the axis of the axle which carries the wheels), a cross slide supported by the frame and movable radially with reference to such axis (the cross slide is preferably mounted on a crosshead extending between the upper ends of columns in a portal type frame and is movable along downwardly inclined ways so that the tools carried by the cross slide can engage the respective workpieces from above), a pair of templet holders mounted on the cross slide and being adjustable as a unit in parallelism with the aforementioned axis, and lateral positioning means for simultaneously adjusting both templet holders with reference to the cross slide.

In accordance with a preferred embodiment of our invention, the machine tool is utilized for reconditioning the peripheral surfaces of wheels which are mounted on a common axle so that their inner faces are turned toward each other and are disposed at a distance which may but need not correspond to a predetermined optimum distance. The wheel lathe then comprises a carriage which is mounted on the cross slide adjacent to one of the templet holders for movement in parallelism with the axis of the wheel set and drive means for moving the carriage with reference to the cross slide. The lateral adjusting means then preferably comprises a single tracking member provided on the carriage and movable therewith against the inner face of one of the wheels to thereby arrest the drive means, a motion transmitting member provided on the carriage, and an adjustable follower provided on the one templet holder and extending into the path of movement of the motion transmitting member to entrain the templet holders as a unit when the carriage is moved with reference to the cross slide. The follower may be adjusted in dependency on the distance between the inner faces of the wheels, i.e., as a function of the difference between the actual distance and the optimum distance between such inner faces. The adjustment may be carried out by a motor which is controllable from a panel serving to store information relating to the actual distance between the inner faces of wheels forming part of that wheel set which is about to be treated.

The novel features which are considered as characteristic of the invention are set forth in particular in the appended claims. The improved wheel lathe itself, however, both as to its construction and its mode of operation, together with additional features and advantages thereof, will be best understood upon perusal of the following detailed description of certain specific embodiments with reference to the accompanying drawings, in which:

FIG. 3 is an enlarged fragmentary front elevational view of a portion of a wheel lathe which, save for certain minor modifications, is practically identical with the lathe of FIGS. 1 and 2;

FIG. 4 illustrates the lateral positioning device which selects the axial position of templet holders in the improved lathe.

Figure 1:
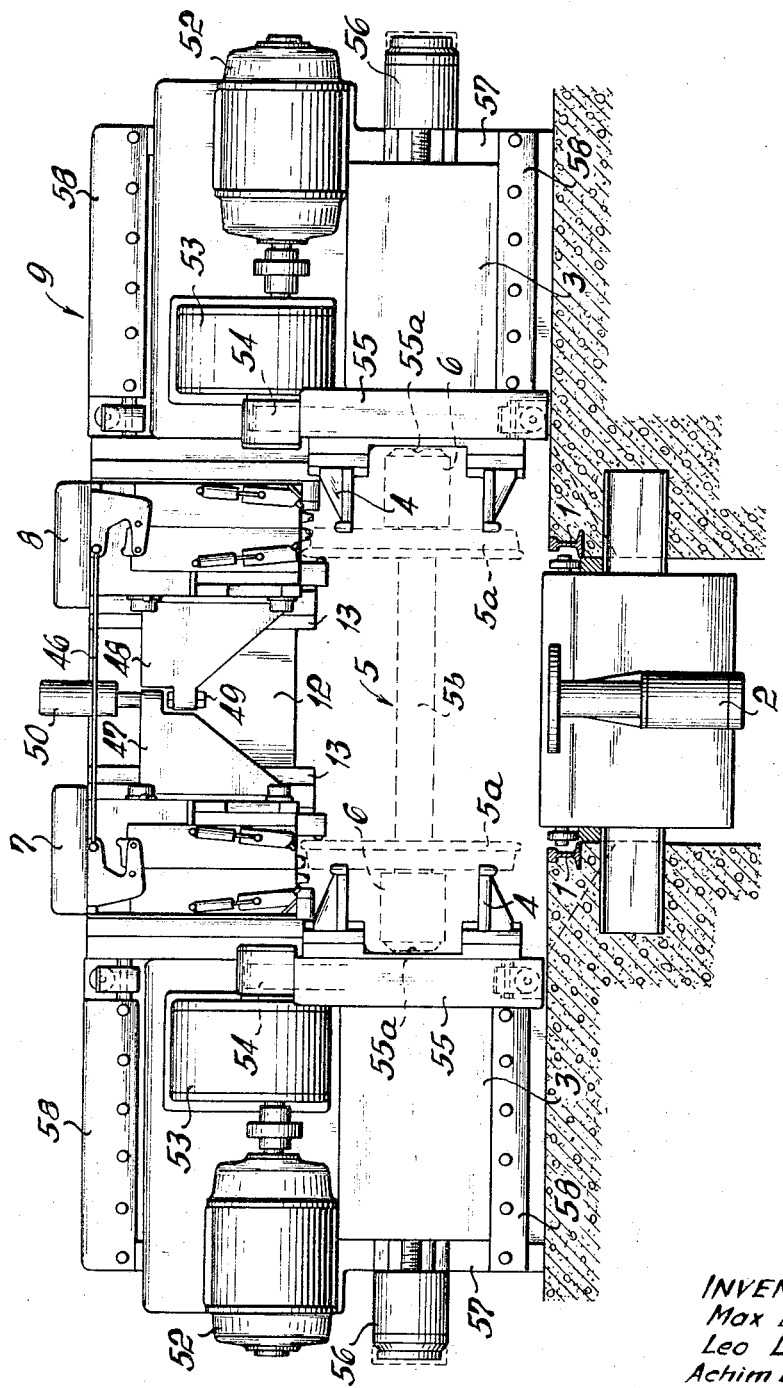
FIG. 1 is a somewhat diagrammatic front elevational view of a wheel lathe which embodies one form of our invention.
Figure 2:
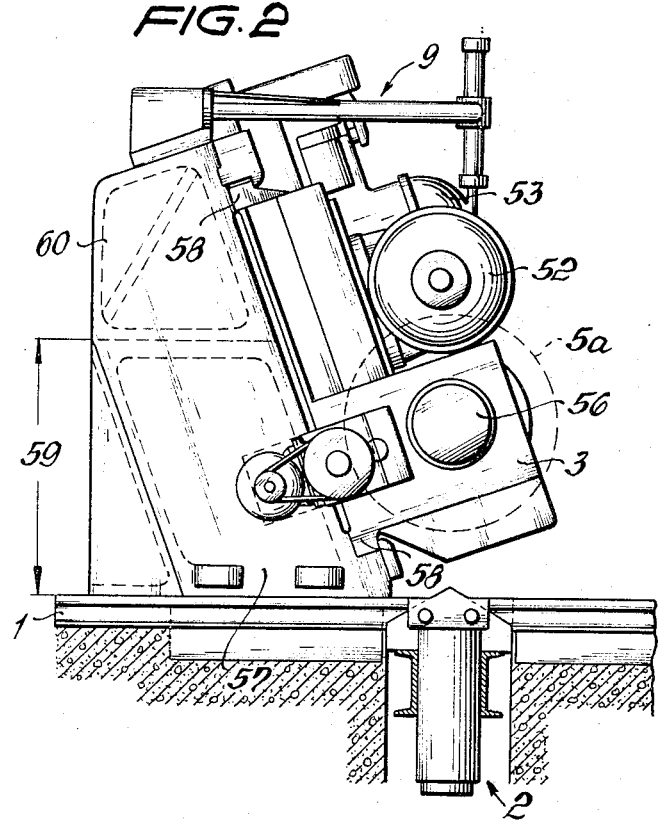
FIG. 2 is a side elevational view of the lathe.

Referring first to FIGS. 1 and 2, there is shown a wheel lathe which comprises a substantially U-shaped portal type frame 9 including two upright frame members or columns 57 disposed at the opposite sides of a workshop track including two parallel rails 1 on which a wheel assembly 5 can be advanced into requisite position for reconditioning of its wheels 5a. This wheel assembly also includes a common axle 5b for the wheels 5a and two journal boxes 6. The frame 9 has a strong crosshead 60 which is connected with the upper end portions of the columns 57 and bridges the rails 1 in a manner clearly shown in FIG. 1. A suitable hydraulic or pneumatic lifting device 2 is disposed in a pit between the rails 1 and serves to lift the wheel assembly 5 so that the axis of its axle 5b coincides with the common axis of two rotary face plates 55. These face plates are mounted on headstocks 3 which are reciprocable in horizontal ways 58 provided on the columns 57. The means for reciprocating the headstocks 3 comprises two hydraulic or pneumatic cylinders 56 mounted on the columns 57 and adapted to move the face plates 55 toward or away from each other. Each face plate 55 is provided with an annulus of combined clamping and motion transmitting projections in the form of dogs or jaws 4 which can be moved into engagement with the outer faces of the wheels 5a and cause these wheels to rotate in response to rotation of the face plates 55. The latter are driven by electric motors 52 through the intermediary of transmissions 53. These transmissions drive pinions 54 which mesh with ring gears on the face plates 55. The face plates remain in mesh with the pinions 54 while their headstocks 5 move along the respective ways 58. Thus, in order to properly locate a wheel assembly 5 in the wheel lathe of our invention, the wheel assembly is advanced along the rails 1 to a position above the lifting device 2 and is then raised so that the axis of the axle 5b coincides with the common axis of the face plates 55. The face plates are then moved toward each other by cylinders 56 so that the journal boxes 6 are engaged by the centers 55a of the respective face plates 55. The jaws 4 are then moved radially outwardly in a manner known from this art and clampingly engage the respective wheels 5a. The motors 52 are thereupon started to drive the face plates 55 through the intermediary of transmissions 53 and pinions 54. Torque transmitted by the jaws 4 suffices to overcome the resistance of turning tools 10, 11 and 10', 11' (see FIG. 3) which are fed into material removing engagement with the rims and/or flanges of the wheels 5a. Alternatively, and as disclosed in the copending application Ser. No. 440,170 of Dombrowski, the face plates 55 need not move toward each other if the jaws or dogs 4 are mounted for movement axially of such face plates.

The numeral 59 denotes in FIG. 2 the height of the space defined by the frame 9 for the passage of wheel assemblies 5.

The wheel lathe further comprises two carriers 7, 8 (also called tool slides) for templets 100 which control movements of the tools 10, 11 and 10', 11' toward and away from the axis of the wheel assembly 5. The carriers 7 and 8 are indirectly supported by the crosshead 60 and the tools extend downwardly so that they engage the wheels 5a at a level above the axle 5b. The carriers 7, 8 are mounted on a common cross slide 12 which is shown in FIG. 3 and can move in ways 13 provided therefor on the crosshead 60. The ways 13 extend radially of the wheel assembly 5a.

The cross slide 12 further supports an automatic diameter selecting device for selecting the desired diameters of the wheels 5a, i.e., for controlling the extent to which surplus material is removed from such wheels by the tools 10, 11 and 10', 11'. This diameter selecting device is shown in FIG. 3 and comprises a rapid traverse (high-speed) motor 14, a feed (slow-motion) motor 15, a feed screw 16 which is rotatable in the crosshead 60 and meshes with a spindle nut 16a secured to the cross slide 12, a commutator 17, a counter wheel 18 and an indexing (step-by-step) switch 19. The numeral 20 denotes a decade-type push button panel which serves to store information and is provided with four rows of pushbuttons.

The motors 14 and 15 can transmit motion to a common output shaft 15a which drives a gear train 63 serving to transmit motion to the feed screw 16 and also to the counter wheel 18. The latter carries trips or stops 64, 65 and contacts or terminals 66, 67. The trips 64, 65 can close switches 69, 68 and the terminals 66, 67 can control the commutator 17. The switch 68 is connected in the circuit of the indexing switch 19. If the feed screw 16 has a lead of 10 mm. and transmission ratio of the gear train 63 is one-to-two, each revolution of the counter wheel 18 corresponds to a displacement of the cross slide 12 through a distance of 5 mm. (along the ways 13). The diameter selecting device counts the number of revolutions of the wheel 18 and such counting begins when the cross slide 12 assumes a predetermined outermost or uppermost position and when a limit switch 70 in the circuit of the switch 68 is closed by a cam 70a of the slide 12. In other words, the diameter selecting device operates in such a way that it counts the number of revolutions of the wheel 18, starting with a maximum diameter of a wheel 5a and proceeding toward a smaller diameter.

The pushbuttons on the decade-type panel 20 will be depressed in a way to select the desired diameter of the wheels 5a. Two rows of pushbuttons are used to effect coarse selection of the diameter in decimeters and centimeters, and the other two rows serve to select the diameter with greater precision in millimeters and tenths of millimeters. The centimeter and decimeter pushbuttons are connected in circuit with the indexing switch 19. The remaining pushbuttons are connected in circuit with the commutator 17. Thus, by depressing selected decimeter and centimeter pushbuttons, the operator permits current to flow through certain contacts of the indexing switch 19. By depressing selected millimeter and tenth-of-millimeter pushbuttons, the operator insures that selected segments of the collector 17 move into engagement with the corresponding terminals.

The counting of full revolutions of the wheel 18, and hence of the number of full revolutions of the feed screw 16, is continued until the number reaches a value corresponding to the setting effected in the indexing switch 19 by the decimeter and centimeter pushbuttons of the panel 20. A contact of the indexing switch 19 then disconnects the motor 14. The idling of this motor 14 is selected in such a way that its output shaft 15a invariably comes to a halt before the wheel 18 can complete a full revolution subsequent to disconnection of the motor 14. Thus, the trips 64, 65 come to a halt ahead of the switches 68, 69. The motor 15 is started in automatic response to disconnection of the motor 14 and causes the trips 64, 65 to move slowly toward the switches 89, 68. When the trip 64 completes a full revolution (but before it reaches a further position corresponding to the shortest switching step), it reaches the switch 69 whereby the switch 69 closes the circuit of the preselected segment of the commutator 17. When the corresponding contact on the wheel 18 reaches such lamination, the motor 15 is shown) which brings the cross slide 12 to a halt in an accurately selected position when the diameters of the wheels 5a are reduced to a desired value. The output shaft of the motor 15 drives a set of gears 15b which can drive the shaft 15a through an electromagnetic clutch 15c. This is fully disclosed in the copending application Ser. No. 439,032 of Louis which is assigned to the same assignee.

Figure 5:
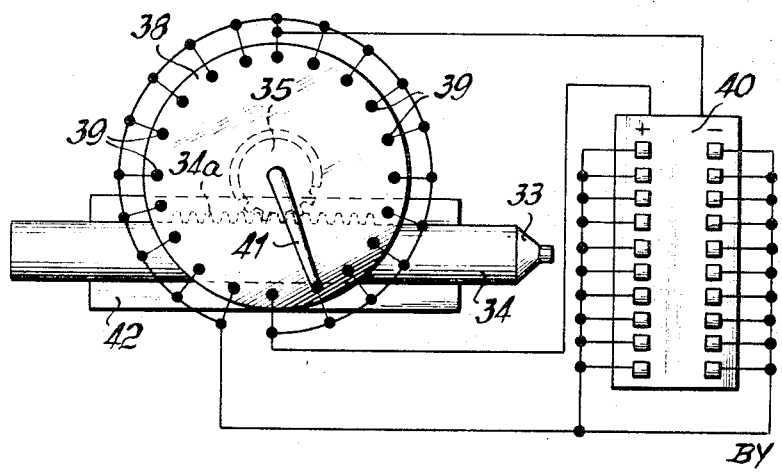
FIG. 5 illustrates a detail of the structure shown in FIG. 4.

The lathe also comprises a novel lateral positioning device for the tools 10, 11 and 10′, 11′. This lateral positioning device is shown in FIGS. 3–5. The tools 10′, 11′ are respectively mounted on copying slides 25, 26 adjustable in a carriage 27 which is reciprocable in ways 27a parallel with the axle 5b. The carriage 27 is fixedly connected with a motion transmitting projection or finger 28 and has an arm 29a for a tracking pin 29 which can track the inner face 31 of a wheel 5a. The tracking pin 29 is biased by a spring 30 which is mounted in the arm 29a. The carriage 27 is moved outwardly, i.e., in a direction from the central portion of the axle 5b toward the inner face 31 of the corresponding wheel 5a, until the tracking pin 29 actually abuts against the inner face 31. The electric motor 102 (see FIG. 2) which drives the carriage 27 is connected in circuit with a pair of normally closed switches 29b, 29c which can be tripped by the tracking pin 29 in such sequence that the motor first reduces its speed and is thereupon brought to a full stop as soon as the pin 29 has been displaced by a preselected distance with reference to the arm 29a and against the bias of the spring 30.

The finger 28 transmits motion to an axially adjustable follower 34 which resembles a pin and has a conical face 33 which can be directly engaged by the finger 28. The follower 34 is provided with a worm 34a which meshes with a worm wheel 35 carried by the output shaft 35a of an adjusting motor 37. When the shaft 35a is rotated, the worm wheel 35 changes the axial position of the follower 34 and thus selects the position of the conical face 33 with reference to the finger 28. The parts 34a, 35 constitute a transmission which can adjust the follower 34 radially of the axle 5b, i.e., radially of the common axis of the face plates 55.

The output shaft 35a extends beyond the worm wheel 35 and supports a contact drum 38 whose fixed contacts 39 are connected with the pushbuttons of a control panel 40 shown in FIGS. 3 and 5.

The wheel assembly 5 which is to be reconditioned is measured by resorting to an optical or other suitable measuring device (not shown) which determines the actual distance between the inner faces 31 of the two wheels 5a. Information relating to the difference between the desired distance and the actual distance is fed into the control panel 40 whereby the pushbuttons of this panel energize selected contacts 39 of the drum 38. The shaft 35a carries a movable contact 41 (see FIG. 5) which cooperates with a selected fixed contact 39 of the drum 38 to arrest the motor 37 when the follower 34 assumes an axial position determined by the information fed to the control panel 40 upon optical measurement of the wheel assembly.

As shown in FIGS. 3 and 4, the follower 34 is supported by a templet holder 42 of the copying unit for the tools 10′, 11′. The holder 42 further supports a rack 43 which can drive a pinion 44 for a potentiometer 45. The latter is connected in a bridge circuit (not shown) which also includes a second potentiometer associated with the templet for the tools 10, 11. Thus, the templet holder 42 associated with the tools 10, 11 performs the same movements as the templet holder 42 of FIG. 4.

Instead of being operatively connected by means of two potentiometers 45, the two templet holders 42 may be mechanically coupled by a rigid connecting rod 46 shown in FIGS. 1 and 3.

As shown in FIG. 1 the one-piece cross slide 12 may be replaced by a two-piece cross slide whose portions or halves 47, 48 are adjustably connected to each other by a coupling 49. The weight of the cross slide 12 or 47–49 is compensated for by a hydraulic weight relief cylinder 50 mounted on the crosshead 60. The cylinder 50 opposes the movement of the cross slide 12 along the downwardly inclined ways 13. As shown in FIG. 1, the ways 13 are located at a level above and are inclined downwardly toward the axis of that wheel assembly 5 which is held between the centers 55a.

The numerals 21, 22 and 21′, 22′ denote additional tool holders (see FIG. 3) which are operated hydraulically and serve to treat the end faces of wheels whenever necessary. Their construction and operation form no part of the present invention.

The exact operation of the diameter selecting device including the panel 20 is disclosed in the aforementioned application Ser. No. 439,032 to Louis and need not be repeated here.

The lateral positioning device of FIGS. 3 to 5 is operated as follows:

When the tools 10, 11 and 10′, 11′ treat the profiles of two mirror symmetrical wheels 5a which form part of a wheel assembly 5, such tools move in dependency on the configuration of templets 100 (see FIG. 3) which are mounted in holders 42 and whose faces are tracked by scanning elements 101 serving to move the tools 10, 11 and 10′, 11′. Thus, the positioning of templets 100 with reference to the wheels 5a determines the diameters of reconditioned wheels as well as axial positions of the newly formed profiles on such reconditioned wheels. In other words, if one of the templets 100 is shifted in the axial direction of a wheel assembly 5 which is held between the face plates 55, the profile formed by the corresponding tools 10, 11 or 10′, 11′ is also shifted axially of the wheel assembly. Since the two templet holders 42 are rigidly or electrically connected to each other (by means of the rod 46 or through the potentiometers 45), it suffices to properly select the axial position of one templet holder 42, i.e., of that templet holder which carries the follower 34 and adjusting motor 37. The other templet holder is then automatically held in an optimum position, as seen in the axial direction of the wheel assembly 5, because the length of the connecting rod 46 is selected with a view to maintain the holders 42 (and hence the templets 100) at a distance corresponding exactly to the gauge of the track on which the wheel assembly is being used.

Once the operator determines the exact distance Ar (see FIG. 3) between the inner faces 31 of the wheels 5a forming part of a wheel assembly which is about to be treated, he knows whether or not such distance Ar corresponds exactly to a predetermined optimum distance (for example 1,360 mm.). If he finds that the actual distance is 1,361 mm., the reconditioning operation can be started: either (a) after the wheel assembly 5 is corrected by moving its wheels 5a nearer to each other, or (b) by dividing the difference (1 mm.) equally into increments of 0.5 mm. and by placing the templets 100 at the same distance from the plane which extends exactly midway between the wheels 5a. The solution (a) is much too complicated and is not used at all. The wheel lathe of our present invention is constructed in such a way that its lateral positioning device can automatically select an optimum position for the templets 100 once the information pertaining to the difference between the actual distance Ar (1,361 mm.) and the optimum or standard distance (1,360 mm.) is fed to the control panel 40. In other words, the two templet holders 42 must be displaced, as a unit, through a distance of 0.5 mm.

Once the control panel 40 receives all necessary information, it energizes the corresponding contacts 39 on the drum 38 and the motor 37 is started to adjust the axial position of the follower 34 as a function of the difference between the actual and optimum distances Ar. When the slide 27 of FIG. 4 is thereupon shifted by its motor, the motion transmitting finger 28 entrains the templet holders 42 through the follower 34 and connecting rod 46. The slide 27 moves rapidly until the tracking pin 29 engages the end face 31 of the corresponding wheel 5a and trips one of the switches 29b, 29c. The slide 27 comes to a halt when the pin 29 trips the other switch whereby the templet holders 42 assume optimum lateral positions with reference to the wheels 5a.

It will be seen that, in contrast to heretofore prevailing practice, the templet holders 42 are connected to each other in such a way that the distance therebetween need not be changed at all while the lateral positioning device selects the position of such holders in the axial direction of a wheel assembly. Such mounting of the templet holders 42 allows for fully automatic lateral positioning of the templets 100. The templet holders 42 and the carriage 27 are movable with reference to the carriers 7 and 8.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a machine tool, particularly in a lathe for reconditioning the wheels of wheel sets for railway vehicles and analogous pairwise arranged mirror symmetrical workpieces, a frame; drive means including means for engaging and rotating the workpieces about a common axis; a cross slide supported by said frame and movable radially with reference to said axis; a pair of templet holders mounted on said cross slide and being adjustable as a unit in the same direction in parallelism with said axis; and lateral positioning means for simultaneously adjusting both templet holders with reference to said cross slide.

2. A structure as set forth in claim 1, further comprising connecting means rigidly coupling said templet holders to each other.

3. A structure as set forth in claim 1, further comprising an operative connection between said templet holders.

4. A structure as set forth in claim 1, wherein said cross slide comprises two portions each of which carries one of said templet holders and connecting means adjustably coupling said portions to each other.

5. A structure as set forth in claim 1, wherein said frame comprises ways for said cross slide, said ways being disposed above and being inclined downwardly toward said axis so that said cross slide tends to descend by gravity, an further comprising weight relief means connected with said cross slide for opposing its movement toward said axis.

6. A structure as set forth in claim 1 for reconditioning the peripheral surfaces of wheels which are mounted on a common axle so that their inner faces are located opposite each other, further comprising a carriage provided on said cross slide adjacent to one of said templet holders for movement in parallelism with said axis and drive means for moving said carriage, said lateral positioning means comprising a tracking member provided on said carriage and movable therewith against the inner face of one of said wheels to thereby arrest said last named drive means, a motion transmitting member provided on said carriage, and an adjustable follower provided on said one templet holder and extending into the path of movement of said motion transmitting member to entrain said templet holders as a unit when said carriage is moved with reference to said cross slide.

7. A structure as set forth in claim 6, wherein said lateral positioning means further comprises adjusting means for adjusting said follower in dependency on the distance between the inner faces of said wheels.

8. A structure as set forth in claim 7, wherein said follower is adjustable substantially radially of said axis and is provided with an inclined surface which extends into the path of movement of said motion transmitting member.

9. A structure as set forth in claim 8, wherein said adjusting means comprises a motor, a transmission driven by said motor and arranged to move said follower with reference to said one templet holder, and information-storing means for controlling the operation of said motor as a function of the difference between the actual distance and the desired distance between said inner faces.

10. A structure as set forth in claim 6, further comprising automatic diameter selecting means operatively connected with said cross slide for moving the latter with reference to said frame.

11. A structure as set forth in claim 10, further comprising a templet removably supported by each of said templet holders, at least one tool for each of said wheels, and operative connections between said templets and said tools.

12. A structure as set forth in claim 11, wherein said frame is a portal type frame and defines a passage through which the wheel sets to be treated may be conveyed seriatim for engagement by said drive means.

13. A structure as set forth in claim 12, wherein said drive means comprises two headstocks supported by said frame, a face plate supported by each headstock and rotatable about said axis, and work-engaging members provided on each of said face plates.

14. A structure as set forth in claim 12, wherein said frame comprises a pair of columns and a crosshead extending between the upper ends of said columns, said cross slide being mounted in downwardly inclined ways provided on said crosshead and further comprising at least two copying slides carried by said cross slide and arranged to support material removing tools in such positions that the tools engage the wheels from above.

15. A structure as set forth in claim 7, wherein said adjusting means comprises a control panel provided on said cross slide.

16. A structure as set forth in claim 15, further comprising means for displacing said cross slide with reference to said frame, including a rotary feed screw mounted in said frame and a nut meshing with said feed screw and fixed to said slide.

References Cited

UNITED STATES PATENTS 355,829   1/1887   Lindstrom et al. ------- 82—8

FOREIGN PATENTS 1,116,588   3/1964   Germany.

HARRISON L. HINSON, *Primary Examiner.*